United States Patent [19]

Lefeber et al.

[11] 4,089,093
[45] May 16, 1978

[54] METHOD OF MANUFACTURING A VARIABLE CAPACITOR

[75] Inventors: Jan Lefeber, Tilburg; Jelis de Jonge, Eindhoven, both of Netherlands

[73] Assignee: U.S. Philips Corporation, New York, N.Y.

[21] Appl. No.: 623,552

[22] Filed: Oct. 17, 1975

[30] Foreign Application Priority Data

Oct. 22, 1974 Netherlands ................... 7413794

[51] Int. Cl.² ............................................. H01G 5/06
[52] U.S. Cl. .................... 29/25.42; 361/298; 427/79; 427/242
[58] Field of Search .............. 427/248 H, 242, 79; 317/253, 254, 258; 29/25.42; 339/95 R, 95 A; 174/119

[56] References Cited

U.S. PATENT DOCUMENTS

| | | | |
|---|---|---|---|
| 1,533,611 | 4/1925 | Respess | 317/253 X |
| 1,652,118 | 12/1927 | Guett | 317/253 |
| 1,719,879 | 7/1929 | Ebon | 317/253 |
| 3,015,765 | 1/1962 | Repko | 317/253 |
| 3,246,627 | 4/1966 | Loeb | 118/49 |
| 3,252,830 | 5/1966 | Cummin | 317/258 |
| 3,558,803 | 1/1971 | Osborn | 174/119 |
| 3,861,776 | 1/1975 | Deal | 339/95 R |
| 3,911,860 | 10/1975 | Nohynek | 427/242 |

FOREIGN PATENT DOCUMENTS

| | | | |
|---|---|---|---|
| 6,605,431 | 7/1967 | Germany | 317/253 |
| 788,614 | 1/1958 | United Kingdom | 317/253 |
| 1,203,213 | 8/1970 | United Kingdom | 427/242 |

Primary Examiner—E. A. Goldberg
Attorney, Agent, or Firm—Frank R. Trifari; Rolf E. Schneider

[57] ABSTRACT

A method of manufacturing variable capacitors having dielectric-coated sheets. The dielectric is permanently connected to the sheets and is provided by vapor deposition before assembly of the capacitors. The dielectric is preferably a polyparaxylylene material.

Electrical contact between the rotor sheets is obtained by arranging the sheets on the rotor shaft with a slight press fit, with or without insertion of spacing rings.

Electrical contact between the stator sheets may be obtained by a scratching or grinding operation on the side of the stator stack, or by a layer of solder.

3 Claims, 5 Drawing Figures

METHOD OF MANUFACTURING A VARIABLE CAPACITOR

This invention relates to a method of manufacturing a variable capacitor comprising a stack of rotor sheets which is arranged to be rotatable with respect to a stack of stator sheets in a holder, the sheets of at least one of said stacks being provided with a dielectric layer which is permanently connected to the sheets.

A method of this kind is known from German Gebrauchsmuster No. 6,605,431. Despite advantages such as high stability, low tan δ, high capacity per volume and limited temperature dependency, a capacitor manufactured according to the known method has the drawback that the manufacture thereof is impeded by the fact that the dielectric, a polyparaxylylene, is vapor-deposited on the fully assembled capacitor. This method of providing a capacitor with a dielectric layer is inefficient, because many parts of the capacitor are unnecessarily provided with a dielectric layer.

The object of the invention is to provide a method of manufacturing a capacitor in which the dielectric is efficiently provided on the stator sheets or rotor sheets only or on both.

According to the invention, prior to the assembly of the stack the individual sheets of at least one of the stacks are provided on all their surface with a dielectric layer which is permanently connected.

The invention will be described in detail hereinafter with reference to the accompanying drawing.

FIG. 1 shows an apparatus 1 whereby loose stator sheets and rotor sheets can be provided with a dielectric layer on their entire surfaces. In a preferred embodiment of the invention the dielectric to be vapor deposited is formed from diparaxylylene.

Figure 1:
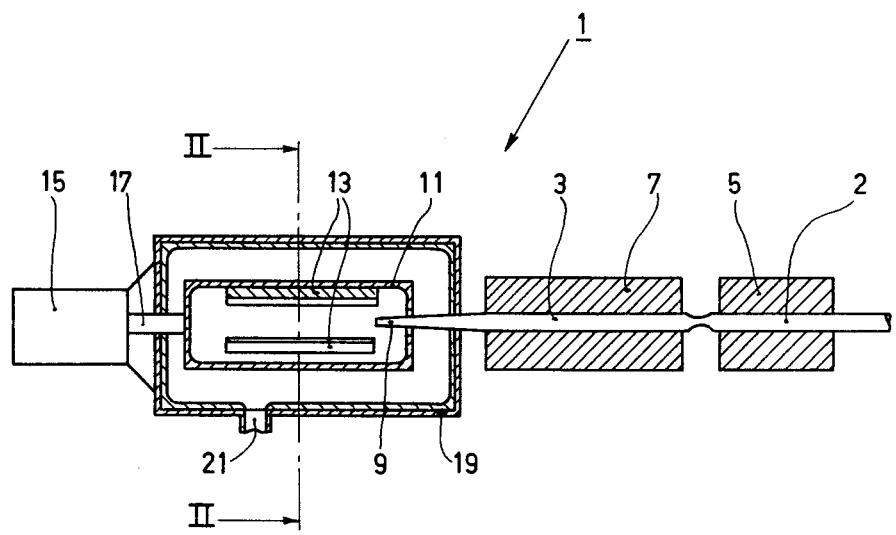
FIG. 1 is a diagrammatic view of an embodiment of a coating apparatus suitable for practicing the invention.

The apparatus 1 comprises a sublimation space 2 and a pyrolysis chamber 3 which are enclosed by ovens 5 and 7, respectively. The sublimation space 2 and the pyrolysis chamber 3 are preferably made of quartz glass. The temperature of the diparaxylylene present in the sublimation space 2 is raised to a value of between 150° and 200°C by the oven 5, with the result that the diparaxylylene sublimates or evaporates. The oven 7 raises the temperature of the vapors from the sublimation space 2 to a value of between 450° and 700° in the pyrolysis chamber 3, so that the vapors are pyrolised. Via a nozzle 9 on the pyrolyzed chamber 3, the vapor is conducted into a rotatable coating drum 11, and vapor is deposited therein on the capacitor sheets. The number of capacitor sheets which can be present in the coating drum 11 amounts to between 50,000 and 100,000 in the preferred apparatus.

The coating drum 11 is preferably provided with guide blades 13 which cause the capacitor sheets to undergo a recurrent tumbling movement upon rotation of the drum 11. The rotation of the drum 11 is between 10 and 500 revolutions per minute and is obtained by means of a motor 15 which is coupled to the drum 11 by way of a shaft 17. The coating drum 11 is arranged in a vacuum vessel 19. The shaft 17 and the nozzle 9 are passed into the vacuum vessel 19 by way of vacuum seals. The vacuum in the vessel 19 is maintained by means of a pump (not shown) which is connected to the vacuum vessel 19 by way of a duct 21.

Figure 2:
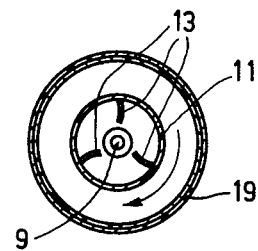
FIG. 2 is a cross-sectional view taken along the line II—II of the apparatus shown in FIG. 1.

FIG. 2 is a cross-sectional view taken along the line II—II in FIG. 1 of the vacuum vessel 19 and the coating drum 11. The guide blades 13 in the coating drum 11 cause a continuous, falling movement of the capacitor sheets, so that the capacitor sheets are prevented from sliding merely along the wall of the coating drum 11, whereby they would only be partly coated.

Rotor sheets 37 are preferably provided with round apertures 25 before introduction into the drum. However, these apertures can alternatively be made after coating.

Figure 3:
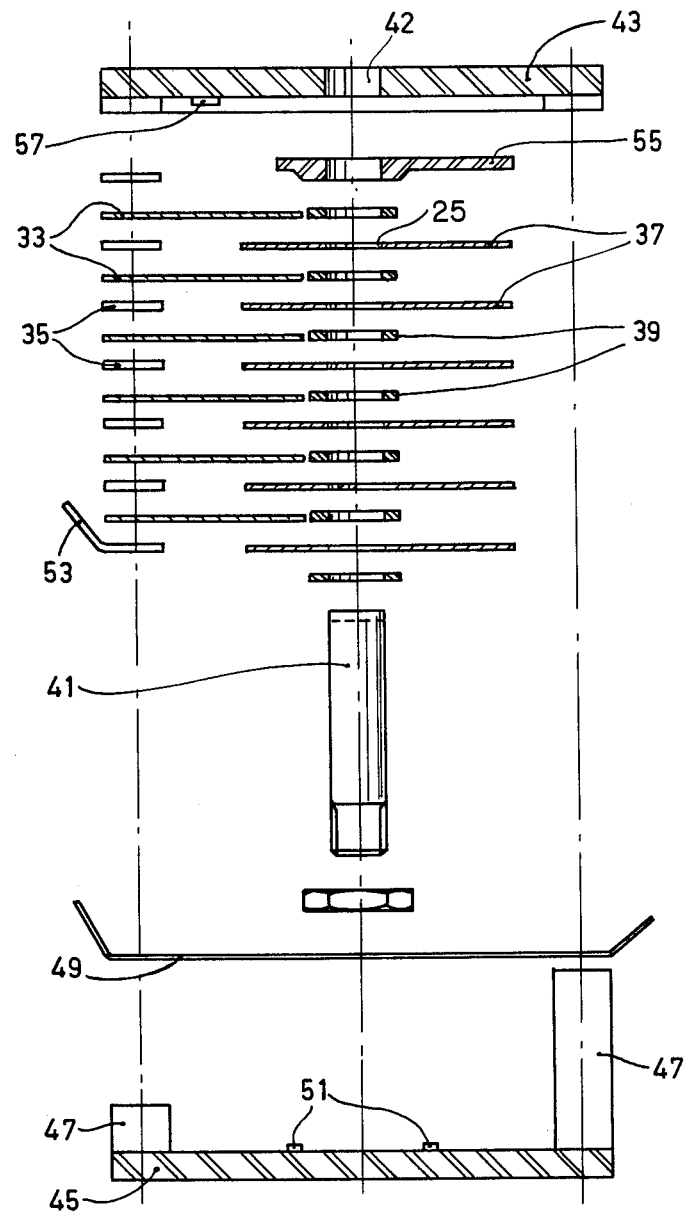
FIG. 3 is a sectional view of the constituent parts used for a preferred method according to the invention.

The following portions must be assembled from the capacitor parts shown in FIG. 3:

a. a stator stack, consisting of stator sheets 33 and spacing rings 35 which are alternately stacked, and b. a rotor stack, consisting of rotor sheets 37, spacing rings 39 and a rotor shaft 41, the rotor sheets 37 being pressed onto the rotor shaft 41. The rotor shaft preferably has a profile in the from of axially extending ridges. Shafts having an hexagonal or square section or the section of a circle which is flat on at least one side can alternatively be used.

The stator stack and the rotor stack are accommodated in a housing (see FIG. 4) which comprises an upper lid 43, and a lower lid 45 which is provided with legs 47. The upper lid 43 and the lower lid 45 are made of a synthetic material, preferably a polycarbonate with a fiberglass filling. The capacitor is assembled by means of bolt and nut connections which are not shown in FIG. 3 and FIG. 4. The legs 47 determine the position of the stator stack as well as the position of the upper lid 43. The rotor shaft 41 is journalled in a hole 42 in the lid 43 on the upper side, and bears on a connection strip 49 of the rotor stack on the lower side. The connection strip 49 is positioned on projections 51 formed on the lower lid 45. A connection strip 53 of the stator stack is clamped between the leg 47 and the stator stack.

The rotor shaft 41 has clamped thereon a steel profiled disk 55 which limits the angular rotation of the rotor stack in conjunction with a cam 57 on the upper lid 43.

Figure 4:
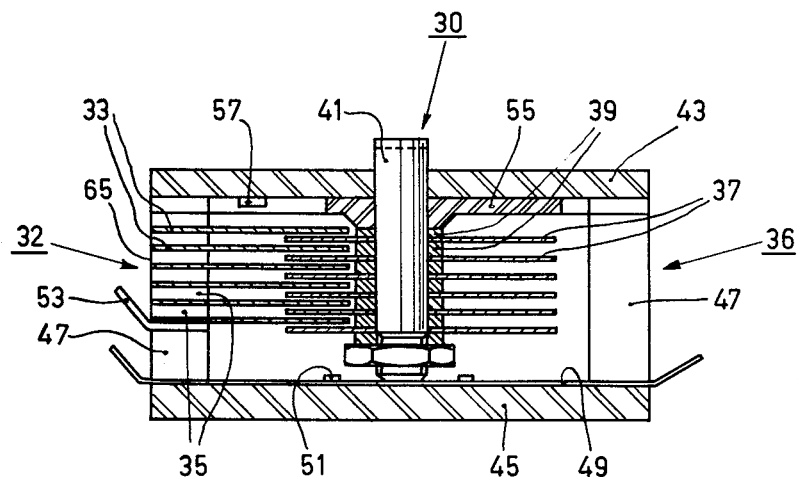
FIG. 4 is a sectional view of a capacitor manufactured according to the invention.

The assembled parts of FIG. 3 form a variable capacitor 30 as shown in FIG. 4. The rotor stack is denoted by the reference 36, and the stator stack by the reference 32.

Figure 5:
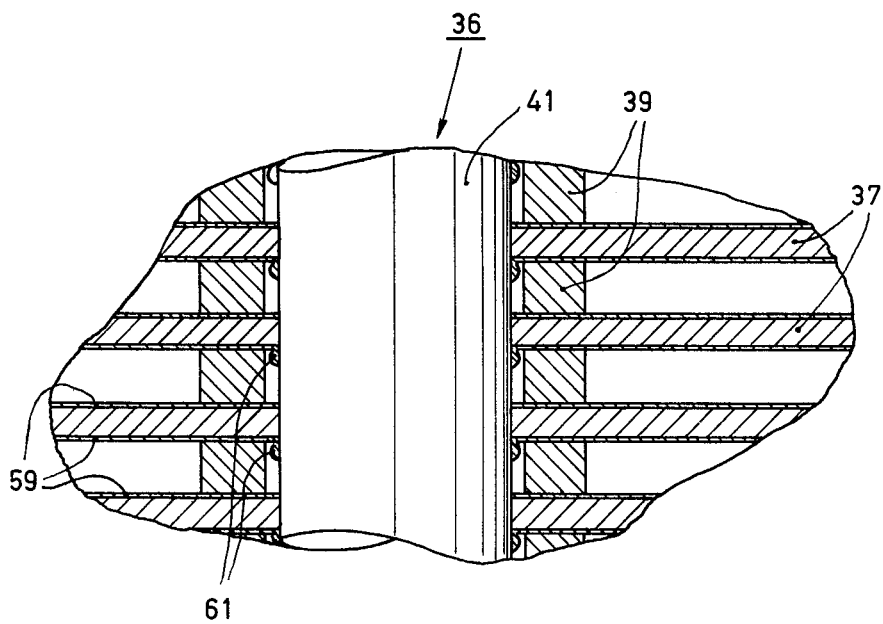
FIG. 5 is a sectional view on an increased scale of a detail of the rotor of the capacitor shown in FIG. 4.

The detail of FIG. 4 which is shown in FIG. 5 illustrates how the rotor stack 36 is assembled. The rotor shaft 41 is pressed into the apertures 25 of the rotor sheets 37 preferably with a slight press fit. Spacing rings 39 have been inserted between the rotor sheets 37. During the mounting of the rotor shaft, the polyparaxylylene layer 59, completely enveloping each rotor sheet 37, is forced out of the aperture in the rotor shaft 37. Surprisingly, it was found that the removed part 61 of the polyparaxylylene is not spread over the rotor shaft 41 at the area of the rotor sheets 37. It was found that a very good electrical contact between rotor shaft 41 and rotor sheets 37 is obtained.

Correct positioning of the rotor sheets 37 can also be obtained by pressing the rotor sheets 37 onto the rotor shaft 41 one after the other, at a clearly defined distance from each other, without insertion of spacing rings 39. Because the stator sheets are completely coated over their entire surfaces with a dielectric layer, it will be necessary to interconnect the sheets electrically during or after the assembly of the stator stacks.

The electrical interconnection of the stator sheets 33 is preferably realized by deformation of the sides 65 of the blades in the stator stack 32, for example, by a scratching or grinding operation. The stator sheets are then electrically interconnected by the spreading of metal. A connection thus established can be further improved by providing a layer of solder between the deformed areas of successive stator sheets.

The said electrical interconnection can also be realized by thermal deformation, for example, by means of a laser beam. The stator sheets can also be electrically interconnected by depositing a layer on the sides of the stator stack by spraying.

What is claimed is:

1. A method of making a variable capacitor which comprises providing a plurality of metal rotor plates each having an aperture, thereafter vapor depositing a film of polyparaxylylene on each rotor plate in a tumbling operation so that no metal of the rotor plates remains exposed, press fitting each coated rotor plate on a metal shaft to thereby remove at least a portion of the polyparaxylylene film from the plate aperture and provide good electrical contact between the rotor plates and the shaft, adjacent rotor plates being spaced from each other, and assembling the resulting stack of rotor plates in capacitive relationship with a stack of correspondingly spaced metal stator plates.

2. A method according to claim 1, in which the shaft is provided with axially extending ridges.

3. A method according to claim 1, in which the stator plates are also provided with a film of polyparaxylylene.

* * * * *